June 13, 1967  R. M. STANTON  3,325,371
APPARATUS AND METHOD FOR BREEDING NUCLEAR FUEL
Filed April 1, 1966
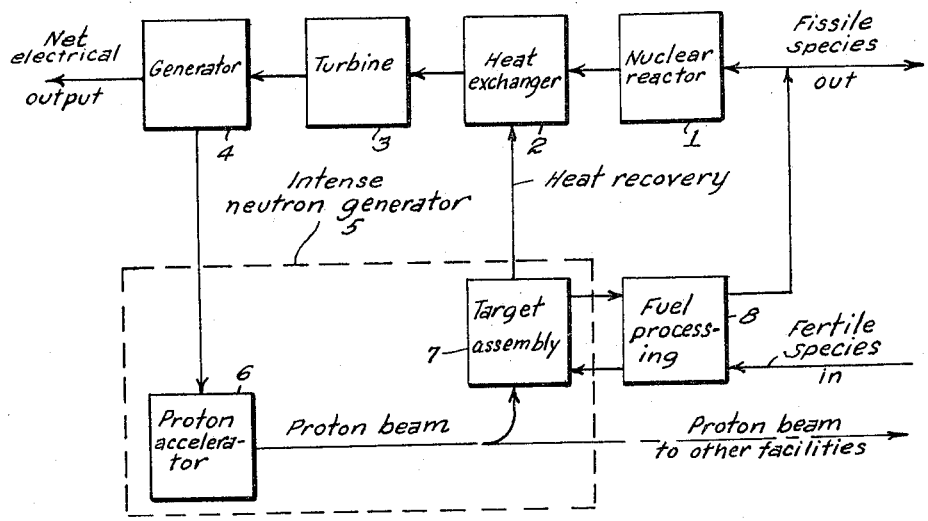
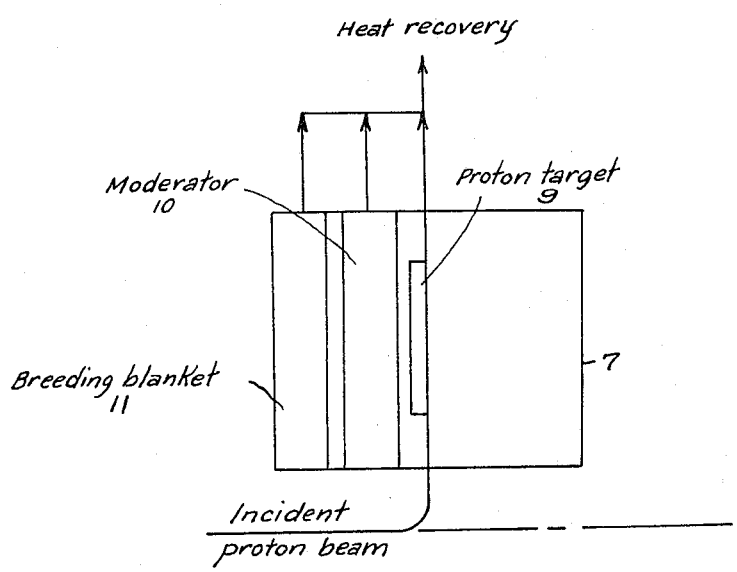
INVENTOR,
Richard Myles Stanton
BY: Harry M. Saragovitz,
Edward J. Kelly
A. J. Dupont
ATTORNEYS.

United States Patent Office 3,325,371
Patented June 13, 1967

3,325,371
APPARATUS AND METHOD FOR BREEDING NUCLEAR FUEL
Richard Myles Stanton, Canton, Mass., assignor to the United States of America as represented by the Secretary of the Army
Filed Apr. 1, 1966, Ser. No. 540,164
6 Claims. (Cl. 176—11)

The invention described herein may be manufactured and used by or for the Government for governmental purposes, without the payment to me of any royalty thereon.

The subject invention relates to an apparatus for breeding fissile nuclear fuel and to the system of operation appertaining thereto.

There appears to be a dwindling supply of certain fuel sources in the world today. In the nuclear field this depletion is particularly severe, especially with respect to the only naturally occurring fissile isotope of uranium. Additionally, conservation efforts must address themselves to available sources of nonfissile uranium and thorium—capable of transformation or "breeding" into the fissile isotopes usable as fuel. Serious attention has been directed to methods for achieving maximum utilization or restoration of or substitution for these critical energy sources.

Another nuclear-related problem which has already presented itself and promises to grow worse is the accumulation of hazardous radioactive waste products which automatically results from the fission within fuel-laden cores of operating nuclear power reactors. Unless such waste is stored or destroyed, public health will be threatened. Limited destruction is presently possible by means of high energy particle (proton) accelerators; to this extent, at least, the inventory of longer-lived waste may be brought under a measure of control.

The same high energy particle accelerator mentioned above is also capable of producing new fissile fuel material and of furnishing a ready facility for attaining nuclear and chemo-nuclear type reactions, if properly utilized. In such mode of utilization resides the present invention.

It is the primary object of the present invention to provide an apparatus and system capable of breeding new sources of fissile nuclear fuel.

It is another object of the present invention to breed such fissile fuel from fertile uranium and thorium.

It is a third object to deliver a net output of useful electric power while so breeding the fissile nuclear fuel.

It is a fourth object to reduce accumulations of longer-lived radio-active wastes to shorter half-lived species more amenable to early disposal.

It is finally an object of the instant invention to provide a flexible experimental facility wherein nuclear and chemo-nuclear type reactions may be conducted.

These and other objects and advantages of the present invention will be fully apparent from the following description taken in connection with the annexed drawing, in which:

FIG. 1 is a block diagram depicting the present invention and its flow of electrical energy, raw fertile material and fissile fuel produced and delivered; and FIG. 2 is a schematic view of the target assembly and the heat balance surrounding it.

For the present apparatus a light water moderated nuclear power reactor 1 is recommended with a high energy (1 bev.) proton accelerator 6.

The core of the nuclear reactor 1 and the "breeding blanket" 11 of fertile material surrounding the moderator 10 and target 9 assume major significance. Without going into too much detail the "breeding ratio," manifesting the ability of the system to produce more fissile material than it consumes, is represented by the following:

$$\text{Breeding ratio} = \frac{\int_{\text{Reactor}}^{\text{Fertile}} \phi \Sigma_c dV + \int_{\text{Blanket}}^{\text{Fertile}} \phi \Sigma_c dV}{\int_{\text{Reactor}}^{\text{Fuel}} \phi(\Sigma_f + \Sigma_c) dV}$$

where $\Sigma_c$ and $\Sigma_f$ are the macroscopic capture and fission cross-sections respectively. The first integral term in the numerator gives the total number of fissile nuclei formed in the light water moderated core of the nuclear reactor 1, while the second integral term in the numerator gives the number of fissile nuclei formed in the blanket surrounding the moderator 10 and proton beam target 9. The integral term in the denominator represents the number of nuclei consumed in the reactor core.

By using a light water moderated nuclear reactor 1, the fraction formed by the first term of the numerator over the denominator will always be less than unity. But when the reactor 1 is combined with an intense neutron generator 5, the system is capable of breeding. This phenomenon is accounted for the second integral term in the numerator of the breeding ratio which will always be large enough to insure that the ratio exceeds unity. During this process, the entire system (FIGURE 1) will be delivering a net output of electrical power from the generator 4 in addition to its output of fissile fuel materials from the reactor 1 and the fuel processor 8.

A gross estimate of the breeding ratio for the present system can be predicted based upon the following conditions:

1. Breeding will occur only in each of the two "blankets" of fertile material—one surrounding the core of the nuclear reactor 1 and the other surrounding the proton target 9 of the target assembly 7;
2. The leakage neutrons from the nuclear reactor 1 core and the proton target 9 constitute separate neutron sources;
3. The energy spectrum of the neutrons from the proton target 9 is essentially "fast," i.e., most of the neutrons will lie in the energy region well above 1.3 million electron volts.
4. No specifiic allowance is made for additional sources of neutrons within the target assembly 7.
5. The blanket of fertile material 11 surrounding the moderator 10 and proton target 9 absorbs nearly all the slightly moderated neutrons originating by spallations from the lead or bismuth.
6. Neutrons below 1.3 mev. energy absorbed in the two breeding blankets do not produce fission.
7. Fast neutrons which undergo slight moderation and are generated by the spallation reactions in the proton target 9 produce fissions solely within the blanket 11.
8. Nuclei absorbing a fast neutron in blanket 11 are unavailable for breeding.

For a 1580 mwt. nuclear reactor, the total number of neutrons produced by fission throughout the core is $$(1.58 \times 10^3)(10^6)(3.1 \times 10^{10})(2.5) = 12.2 \times 10^{19} \text{ sec}^{-1}$$

This is the source strength $S_1$, for the 1580 mwt. nuclear reactor.

The lead-bismuth proton target 9 of the present invention has a source strength $S_2$, of $10^{19}$ sec$^{-1}$ due to spallation reactions produced by an incident beam of 1 bev. protons having an intensity of 60–70 milliamperes.

Direct comparison reveals that the source $S_2$, has approximately 10 percent the strength of $S_1$. Also, the source $S_2$ is roughly equal to the rate at which the large power reactor 1 is losing neutrons to the outside.

On the other hand, leakage neutrons from the core of the nuclear reactor, to its surrounding breeding blanket, contribute a fraction of approximately $$\frac{\nu_1}{1+\alpha_1}-1$$

where $\nu_1$ is the average number of fission neutrons produced per capture of a thermal neutron in fissile fuel species;

and $$\alpha_1 = \frac{\Sigma_c}{\Sigma_t}$$

per thermal neutron absorbed, to the breeding ratio of the entire system.

The fraction of neutrons lost from the reactor core by leakage, and then absorbed by radiative capture in the blanket of fertile material surrounding the core, determines the "external breeding ratio." Although internal conversion also contributes another fractional part to the total breeding ratio due to the conversion (or breeding) taking place within the interior of the core, its contribution is disregarded to arrive at a conservative estimate of the overall breeding ratio for the system.

From the proton target 9, slightly moderated neutrons will have an average energy well in excess of 1.3 mev. Nearly all the fast neutrons from this source, following their entry into the breeding blanket of fertile material, will produce by fission an additional number of neutrons at a ratio equal to $$\frac{\nu_2}{1+\alpha_2}-1$$

per fast neutron absorbed; where $\nu_2$ is the average number of fission neutrons produced per capture of a high energy neutron (10 mev.) in a fissile fertile species; and $\alpha_2 = \alpha_1$.

The new source of neutrons caused by fission of $U^{238}$ or $Th^{232}$, should in all respects be identical to the familiar neutron fission energy spectrum. Average energy for neutrons in the fission spectrum is about 1 mev. By contrast, the average neutron energy for the particular spallation reaction of interest in this system, is approximately 10.0 mev.

Most of these newly produced fission neutrons from $U^{238}$ or $Th^{232}$ will be absorbed in radiative capture by the nuclei of the fertile material, since their average energy is below the 1.3 mev. threshold for fission in $U^{238}$ or $Th^{232}$.

The rate at which the fast neutrons produce radiative captures within the breeding blanket of the porton target will require adjustment to a somewhat lower value in order to translate it into a more general expression for determining the total breeding ratio for the system. This is accomplished by using the ratio of the strengths of the two neutron sources $S_1$, and $S_2$ as a "weighting" factor. The contribution to the overall breeding ratio from the proton target now becomes $$\frac{S_2}{S_1}\left(\frac{\nu_2}{1+\alpha_2}-1\right)$$

Finally, an approximate, but nevertheless conservative estimate for the total breeding ratio of the invention is given as follows:

$$\text{Total breeding ratio} = \frac{\nu_1}{1+\alpha_1}-1+\frac{S_2}{S_1}\left(\frac{\nu_2}{1+\alpha_2}-1\right)$$

This reduces to $$\text{Total breeding ratio} = \eta_1 - 1 + \frac{S_2}{S_1}(\nu_2-1)$$

since $\alpha_2$ is much less than unity for interactions of fast neutrons with heavy nuclei undergoing fission. Upon substituting suitable numerical values in the above expression, it is found that the breeding ratio for the instant system is 1.28, 1.31 and 1.62 for a thermal nuclear fueled respectively with $Pu^{239}$, $U^{235}$ and $U^{233}$. ($\eta_1$=2.03, 2.08 and 2.37 for $Pu^{239}$, $U^{235}$ and $U^{233}$ respectively.)

It is emphasized that no allowance has been given to contributions due to internal conversions from within the core of the nuclear reactor. Inclusion of this fraction due to the internal conversion ratio would add substantially to the overall breeding ratio.

Internal conversions within the core of the nuclear reactor will offset and thus cancel out the effects of parasitic capture losses and stray leakages encountered throughout the system.

While maintaining the same net power output from the system, additional energy available as heat from the target assembly would automatically impose less of a burden upon the nuclear reactor. In turn, the nuclear reactor would consume less fissile fuel. Hence, the breeding ratio for the entire system would increase.

Turning now to the heat balances within the system, it is apparent that heat dissipated by the high energy beam of protons within the target assembly 7 is readily recoverable. The target itself should be made of lead or bismuth. Another source of recoverable heat is the conversion of the energy released by fast fissions occurring within the blanket of fertile material ($U^{238}$ or $Th^{232}$) 11 surrounding the moderator 10 of the target assembly. See FIGURE 2. The thermal conditions under which the sum of the two sources of heat in the target assembly is recovered is utilized advantageously by superheating the steam furnished to the steam turbine 3 by the heat exchanger 2.

The suggested capacities for each of the components in the system are as follows:

Nuclear reactor _____ mw.(t) __ 1580
Heat exchanger _____ mw.(t) __ 1800
Turbine _____ mw.(e) __ 600
Generator _____ mw.(e) __ 600
Proton accelerator _____ mw.(e) __ 150

With such capacities 450 mwe. would be the net electrical output of the system. The 150 mwe. proton accelerator would generate a proton beam of 1 bev. and 60–70 milliamperes.

Also suggested, as components of the target assembly are a moderator of heavy water or beryllium, a proton target of bismuth or lead and a breeding blanket of uranium-238 or thorium-232.

While only preferred forms of the invention are shown and described, other forms of the invention are contemplated and numerous changes and modifications may be made therein without departing from the spirit of the invention as set forth in the appended claims.

What is claimed is:

1. An apparatus for breeding nuclear fuel comprising, in combination, fertile fissile fuel, a fuel processing unit for said fuel, a nuclear reactor to react said processed fuel to generate heat, a heat exchanger to receive said heat and transform said heat into steam, a turbine driven by said steam, an electric generator driven by said turbine, and a neutron generator powered with electrical energy from said electrical generator, said neutron generator receiving fertile fuel species from said fuel processing unit and generating and transmitting heat to said heat exchanger, said last named generator also generating and transmitting a proton beam for ulterior use, and also generating and transmitting fissle nuclear fuel through said fuel processing unit to said nuclear reactor and forming a stockpile.

2. The apparatus set forth in claim 1, wherein said neutron generator consists of a proton accelerator powered by electric energy from said generator and emitting an accelerated proton beam, and a target assembly which receives said proton beam and nuclear fuel and generates heat and fissile nuclear fuel.

3. The apparatus set forth in claim 2, wherein said target assembly consists of a breeding blanket of fertile nuclear material, a moderator and a proton target.

4. The apparatus set forth in claim 3, wherein said fertile nuclear material is comprised of at least one of the radioactive elements from the group consisting of uranium-238 and thorium-232.

5. A method of breeding nuclear fuel, comprising the steps of selecting a nuclear fuel element, feeding said fuel element to a fuel processing unit, further feeding said processed fuel to a nuclear reactor, reacting said fuel within said reactor, passing the heat generated by said reaction to a heat exchanger, converting said heat into steam in said heat exchanger, forcing said steam into a turbine thereby activating said turbine with said steam, rotating a generator connected to said turbine thereby generating electrical energy, transmitting said electrical energy to a neutron generator comprising a proton accelerator and a target assembly, feeding processed fuel from said fuel processing unit into said neutron generator, generating heat, a proton beam and fissile nuclear fuel in said neutron generator, transferring said generated heat to said heat exchanger to form steam, supplying said steam to the turbine, directing said proton beam for ulterior use, and removing said generated fissile fuel to said fuel processing unit, extracting said generated fissile fuel from said fuel processing unit and feeding a portion thereof back into said nuclear reactor.

6. A method as set forth in claim 5, including the intermediate steps of generating a proton beam from said proton accelerator, directing a portion of said proton beam from said proton accelerator to said target assembly, striking said target assembly with said portion of said proton beam.

References Cited

UNITED STATES PATENTS 2,933,442  4/1960  Lawrence et al. _____ 176—11

OTHER REFERENCES

AEC–Document, CONF–650217, February 1965, pp. 73–76.

L. DEWAYNE RUTLEDGE, *Primary Examiner.*

CARL D. QUARFORTH, *Examiner.*

H. E. BEHREND, *Assistant Examiner.*